Aug. 12, 1952 G. S. ELGIN 2,606,431
ADJUSTABLE DRIVE CLUTCH FOR REGULATING THE TORQUE
IMPARTED TO A DRIVEN MEMBER
Filed Aug. 18, 1947 2 SHEETS—SHEET 1
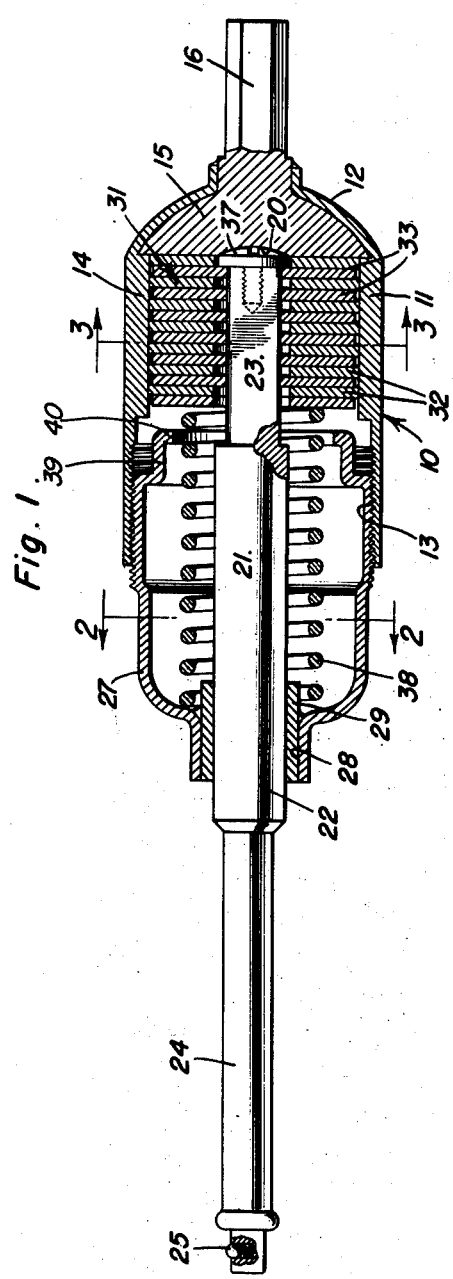
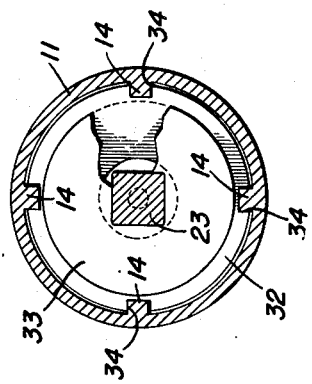
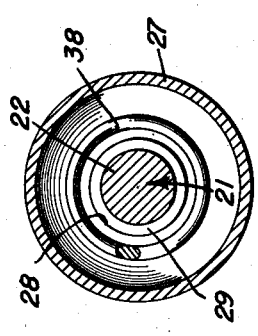
Inventor
Gustavus S. Elgin
By Clarence A. O'Brien
and Harvey B. Jacobson
Attorneys Aug. 12, 1952     G. S. ELGIN     2,606,431
ADJUSTABLE DRIVE CLUTCH FOR REGULATING THE TORQUE
IMPARTED TO A DRIVEN MEMBER
Filed Aug. 18, 1947     2 SHEETS—SHEET 2
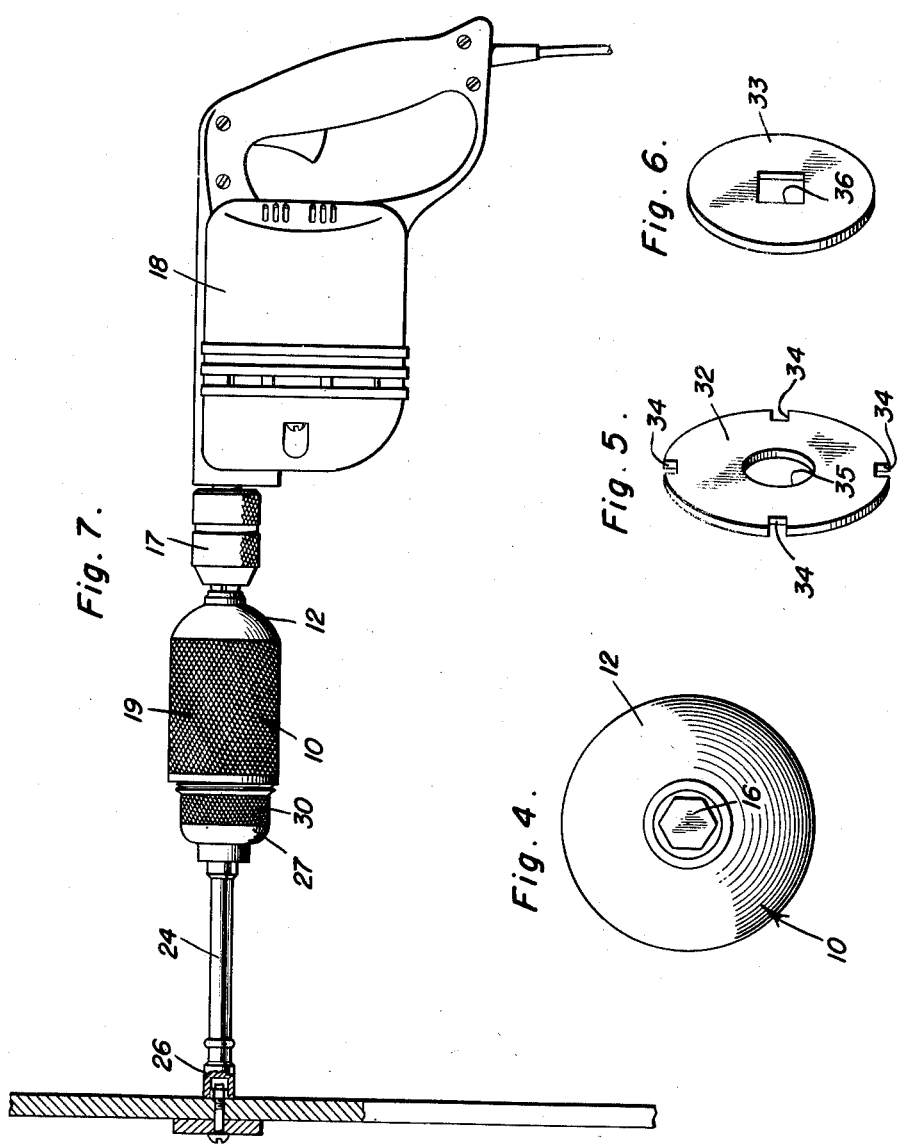
Inventor
Gustavus S. Elgin
By Clarence A. O'Brien
and Harvey B. Jacobson
Attorneys Patented Aug. 12, 1952

2,606,431

UNITED STATES PATENT OFFICE 2,606,431

ADJUSTABLE DRIVE CLUTCH FOR REGULATING THE TORQUE IMPARTED TO A DRIVEN MEMBER

Gustavus S. Elgin, Hickman Mills, Mo.

Application August 18, 1947, Serial No. 769,142

4 Claims. (Cl. 64—30)

This invention relates to an adjustable drive clutch and more particularly to a wrench attachment by means of which the torque applied to a nut may be governed.

In many mechanical operations it is desirable to tighten a nut on a bolt to a predetermined degree which will assure a tight coupling and at the same time avoid the stripping of the threads of the nut or bolt. In instances where the degree of tightening of the nut is left entirely to the mechanic the human element enters into the operation with the result that when a series of nuts is to be tightened, the degree of tightness may vary over a wide range, and the lack of uniformity frequently results in stressing certain parts of the work to various degrees.

The primary object of this invention is to insure uniformity of the stress imposed upon the work and prevent the over-tightening of nuts on one part thereof and the under-tightening in other parts.

Another object is to eliminate the human element involved when tightening nuts on bolts and thus to insure uniform stress on all parts of the work.

A further object resides in the provision of an attachment for a wrench by which the torque imparted to the wrench by a wrench driving means may be regulated so as to insure uniformity in the tightening of a group of nuts against a piece of work.

The above and other objects may be attained by employing this invention which embodies among its features a group of axially aligned juxtaposed friction disks, alternate disks having driving connection with a driving member, intermediate disks having driving connection with a driven member, yielding means in axial alignment with the disks to urge the disks into frictional contact with one another, and means to regulate the pressure exerted by the yielding means on the disks.

Other features include a housing, a plurality of radially spaced longitudinally extending ribs within the housing, a group of axially aligned friction disks within the housing, alternate disks in said group having peripheral notches for the reception of the ribs on the housing, a shaft extending axially through the disks, said shaft having driving connection with the intermediate disks in said group of disks, a stop carried by the housing against which one end of the group of disks bears, a compression coil spring encircling the shaft and bearing at one end on the group of disks, and a cup threaded onto the housing and bearing on the end of the spring remote from the group of disks, whereby when the cup and housing are rotated relative to one another, the pressure of the spring on the disks will be varied.

Yet another feature of this invention resides in the provision of a diametrically reduced collar on the end of said cup, which collar is receivable in the ribbed portion of the housing and engageable with the disks, to positively urge the disks into engagement with each other.

In the drawings,

Figure 1 is a longitudinal sectional view through a wrench attachment embodying the features of this invention.

Figure 2 is a transverse sectional view taken substantially along the line 2—2 of Figure 1.

Figure 3 is a transverse sectional view taken substantially along the line 3—3 of Figure 1.

Figure 4 is an end view of the attachment showing the driving shank therefor.

Figure 5 is a perspective view of one of the friction disks employed in connection with the device.

Figure 6 is a perspective view of one of the intermediate friction disks, and

Figure 7 is a view illustrating the device in use.

Referring to the drawings in detail, a circular cylindrical shell designated generally 10 comprises a tubular body 11 having a dome-shaped end 12 and provided at its opposite end with a series of internal screw-threads 13 the purpose of which will be more fully hereinafter explained. Formed at radially spaced points on the shell and projecting inwardly from the inner periphery thereof are longitudinally extending ribs 14 and fitted into the shell between the inner ends of the ribs and the end closure 12 is a stop 15 carrying a drive shaft 16 which projects outwardly through the end 12 of the shell and is adapted to be coupled to any suitable driving mechanism such as the drill chuck 17 of an electric drill 18. The exterior of the tubular body 11 is preferably knurled as at 19 (Fig. 7) and the stop 15 is provided with an axial recess 20 on its inner face for a purpose to be more fully hereinafter explained. Extending axially into the tubular shell 11 from the threaded end is a driven shaft designated generally 21 which comprises a circular cylindrical portion 22 having at one end a rectangular extension 23 and at its opposite end a shank 24 carrying a suitable detent 25 by means of which a wrench socket 26 (Fig. 7) is detachably supported on the end of the shank.

Threaded into the threaded end 13 of the shell or tubular body 11 is a cup-shaped end closure 27 having an axial opening 28 in which a bearing bushing 29 is fitted. This bearing bushing encircles the circular cylindrical portion of the shaft 22 and serves rotatably to support the shaft with relation to the cap. That portion of the cap 27 which projects beyond the end of the shell or housing 10 is knurled as at 30 on its periphery so that an anti-slip surface is provided by which the cap may be rotated relative to the shell. The cup-shaped closure 27 has a diametrically reduced collar 39 on its inner end, and an inwardly directed flange 40 on the inner end of the collar. The collar is receivable in the ribbed portion of the shell, for reasons which will later become apparent, as the following description proceeds.

Surrounding the squared end 23 of the shaft 21 is a group of disks designated generally 31, alternate disks 32 of which are of greater diameter than the intermediate disks 33 and are provided with peripheral notches 34 which are adapted to receive the ribs 14 so as to rotate in unison with and be driven by the shell 11. These disks 32 are provided with relatively large axial openings 35 to accommodate the squared portion 23 of the shaft 21 and avoid contact therewith. The intermediate disks 33 which are of less diameter than the alternate disks 32 are provided with axial rectangular openings 36 slidably to fit over the squared portion 23 of the shaft 21 and establish driving connection between the alternate disks and the shaft. As previously explained, the disks 33 are of less diameter than the disks 32 so as to avoid contact with the ribs 14 in the shell 11. It will thus be seen that the disks in the group 31 may move longitudinally within the shell and along the squared portion of the shaft 23, but the alternate disks 32 in the group have driving connection with the shell 11 while the intermediate disks 33 having driving connection with the shaft. A suitable stop screw 37 is threaded on the inner end of the squared portion 23 of the shaft 21 and is accommodated in the recess 20 formed in the stop 15 previously referred to, the periphery of the screw 37 being rotatably disposed in the opening in the disk 32 which abuts the end of the shell 11.

Seated against the end of the cup 27 remote from its threaded end and extending longitudinally therethrough is a compression coil spring 38, one end of which bears against the end of the cup 27, while its opposite end bears against the endmost disk of the group of disks 31 remote from the stop 15. It will thus be seen that the disks will be held against one another under the yielding pressure of the spring 38 and against the stop 15 so that when rotary motion is imparted either to the shank 16 or the shank 24, the opposite shank will be driven through the medium of the contact of the disks 32 and 33 against one another.

In use, the drive shank 16 is introduced into the chuck 17 of any suitable driving device such as the hand drill 18 and by adjusting the cup 27 with relation to the shell 11 the degree of pressure exerted by the spring 38 against the disks in the group 31 may be regulated. With a wrench socket mounted on the end of the shank 24, it will be obvious that when the socket is mounted over a nut and the drill motor 18 operated the nut will be turned on the bolt through the medium of the clutch disks 31. When the nut has reached a certain degree of tightness on the bolt and against the work, it is obvious that slippage will occur between the disks 32 and 33 of the group of disks 31, so that further turning of the nut will be avoided. In this way, the over-tightening of the nut against the work may be avoided and by repeated use of the tool with the same adjustment on a group of nuts, it is obvious that the nuts may be driven home against the work and the pressure exerted by the nuts on the work will be uniform throughout. Obviously, the degree to which the nuts may be tightened can be regulated by turning the cup 27 relative to the shell 11 so as to advance or retract it and thereby vary the pressure of the spring 38 against the group of disks. Whenever it is desired to increase the pressure on the disks, above that which is applicable through the spring 38, it is merely necessary to tighten the cup-shaped closure so that the flange 40 on the collar 39 abuts the disks and compresses them against each other and the end wall of the shell 11.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. An adjustable drive clutch comprising a cylindrical clutch housing having an internally threaded end portion, a longitudinally extending rib on the interior of said housing adjacent the end thereof remote from internally threaded end portion, a first set of notched disks slidably and non-rotatably disposed in the ribbed end of said housing, a cup having an externally threaded end portion threaded into said housing, said cup having an axial bore therein, a shaft rotatably received in said bore and extending into said housing, a second set of clutch disks interposed between the disks of said first set and slidably and non-rotatably mounted on said shaft, an end plate abutting the end clutch disc adjacent said cup, spring means disposed about said shaft and terminally abutting said cup and said end plate to yieldingly urge the disks of said first and second sets into engagement with each other, a diametrically reduced collar on said externally threaded end portion of said cup receivable in said ribbed portion of said housing, said cup and said housing being threadedly adjustable relative to each other whereby said collar will engage said end plate to positively urge the disks of said first and second sets into engagement with each other.

2. An adjustable drive clutch comprising a cylindrical clutch housing having an end wall, said housing having an internally splined portion adjacent said end wall and an internally threaded open end portion, a cup having an externally threaded open end portion threaded into said housing, said cup having an axial bore therethrough, a shaft rotatably received in said bore and having an externally splined portion extending into said housing, a first set of clutch disks slidably and non-rotatably mounted in said splined portion of said housing, a second set of clutch disks having keyed bores therein interposed between said disks of said first set and slidably and non-rotatably mounted on said splined portion of said shaft, one of said disks of said second set abutting said end wall of said housing, each of said disks of said first set having an axial bore therein rotatably receiving said splined portion of said shaft, an end plate abutting the end clutch disc adjacent said cup, a cap on the end of said splined portion of said shaft and having a perimetric bearing surface, said cap being of a diameter substantially equal to that of the bores in said first set of disks, said cap being rotatable in the bore of said disk of the first set which abuts the end wall of said housing, spring means disposed about said shaft and engaging said end plate to urge said disks of said first and second sets into engagement with each other.

3. An adjustable drive clutch comprising a cylindrical clutch housing having an end wall, said housing having an internally splined portion adjacent said end wall and an internally threaded open end portion, a cup having an externally threaded open end portion threaded into said housing, said cup having an axial bore therethrough, a shaft rotatably received in said bore and having an externally splined portion extending into said housing, a first set of clutch disks slidably and non-rotatably mounted in said splined portion of said housing, a second set of clutch disks having keyed bores therein interposed between said disks of said first set and slidably and non-rotatably mounted on said splined portion of said shaft, one of said disks of said second set abutting said end wall of said housing, an end plate abutting the end disc adjacent the threaded end of said housing, each of said disks of said first set having an axial bore therein rotatably receiving said splined portion of said shaft, a cap on the end of said splined portion of said shaft and having a perimetric bearing surface, said cap being of a diameter substantially equal to that of the bores in said first set of disks, said cap being rotatable in the bore in said disk of the first set which abuts the end wall of said housing, spring means disposed about said shaft and engaging said end plate to urge said disks of said first and second sets into engagement with each other, a diametrically reduced collar on said externally threaded end portion of said cup receivable in said internally splined portion of said housing, said cup and housing being threadedly adjustable relative to each other whereby said collar will engage said end plate to positively urge said disks of said first and second sets into engagement with each other.

4. An adjustable drive clutch comprising a cylindrical clutch housing having an end wall, said housing having an internally splined portion adjacent said end wall and an internally threaded open end portion, a cup having an externally threaded open end portion threaded into said housing, said cup having an axial bore therethrough, a shaft rotatably received in said bore and having an externally splined portion extending into said housing, a first set of clutch disks slidably and non-rotatably mounted in said splined portion of said housing, a second set of clutch disks having keyed bores therein interposed between said disks of said first set and slidably and non-rotatably mounted on said splined portion of said shaft, one of said disks of said second set abutting said end wall of said housing, each of said disks of said first set having an axial bore therein rotatably receiving said splined portion of said shaft, an end plate abutting the end disk adjacent the threaded end of said housing, a cap on the end of said splined portion of said shaft and having a perimetric bearing surface, said cap being of a diameter substantially equal to that of the bores in said first set of disks, said cap being rotatable in the bore in said disk of the first set which abuts the end wall of said housing, spring means disposed about said shaft and engaging said end plate to urge said disks of said first and second sets into engagement with each other, a diametrically reduced collar on said externally threaded end portion of said cup receivable in said internally splined portion of said housing, said cup and housing being threadedly adjustable relative to each other whereby said collar will engage said end plate to positively urge said disks of said first and second sets into engagement with each other, said end plate rotatably mounted on said shaft and rotatably received in said splined portion of said housing.

GUSTAVUS S. ELGIN.

REFERENCES CITED

The following references are of record in the file of this patent:

UNITED STATES PATENTS

| Number | Name | Date |
| --- | --- | --- |
| 1,503,446 | Hedglon | July 29, 1924 |
| 2,335,574 | Thompson et al. | Nov. 30, 1943 |

FOREIGN PATENTS

| Number | Country | Date |
| --- | --- | --- |
| 193,009 | England | 1924 |